US009428297B2

(12) United States Patent
Lewis et al.

(10) Patent No.: US 9,428,297 B2
(45) Date of Patent: Aug. 30, 2016

(54) CONTAINER WITH REINFORCED UPPER PORTION FOR RECEIVING WELDED CLOSURE

(71) Applicant: Amcor Limited, Hawthorn, Victoria (AU)

(72) Inventors: Matthew Ryan Lewis, Dexter, MI (US); James Clayton Gratke, Saline, MI (US); George Alex Thierjung, Loveland, CO (US)

(73) Assignee: Amcor Limited, Hawthorn (AU)

( * ) Notice: Subject to any disclaimer, the term of this patent is extended or adjusted under 35 U.S.C. 154(b) by 29 days.

(21) Appl. No.: 14/378,154

(22) PCT Filed: Feb. 19, 2013

(86) PCT No.: PCT/US2013/026667
§ 371 (c)(1),
(2) Date: Aug. 12, 2014

(87) PCT Pub. No.: WO2013/126328
PCT Pub. Date: Aug. 29, 2013

(65) Prior Publication Data
US 2015/0014335 A1    Jan. 15, 2015

Related U.S. Application Data

(60) Provisional application No. 61/602,211, filed on Feb. 23, 2012.

(51) Int. Cl.
*B65D 1/42* (2006.01)
*B65D 1/44* (2006.01)
(Continued)

(52) U.S. Cl.
CPC ............. *B65D 1/42* (2013.01); *B29C 49/20* (2013.01); *B29D 22/003* (2013.01); *B65D 1/22* (2013.01);
(Continued)

(58) Field of Classification Search
CPC . B65D 1/26; B65D 1/42–1/46; B65D 17/12; B65D 17/14; B65D 77/2024; B65D 2543/00425
See application file for complete search history.

(56) References Cited

U.S. PATENT DOCUMENTS 3,915,330 A    10/1975 Hammes et al.
4,429,805 A    2/1984 Letica
(Continued)

FOREIGN PATENT DOCUMENTS

EP    0758612 A1    2/1997

OTHER PUBLICATIONS

International Search Report and Written Opinion for PCT/US2013/026667, mailed May 16, 2013; ISA/KR.

*Primary Examiner* — Anthony Stashick
*Assistant Examiner* — Mollie Llewellyn
(74) *Attorney, Agent, or Firm* — Harness, Dickey & Pierce, PLC

(57) ABSTRACT

A plastic container having a longitudinal axis includes an upper portion that defines an opening into the container and a sidewall portion that extends from the upper portion in a longitudinal direction parallel to the longitudinal axis. The container also includes a base portion that extends from the sidewall portion and that closes off the container. The upper portion further includes a rim member, a neck member that extends in the longitudinal direction away from the rim member, and a shoulder member that extends from the neck to the sidewall portion. The shoulder member extends at an acute angle relative to a transverse plane that is substantially perpendicular to the longitudinal axis. The upper portion also includes at least one reinforcing member that extends in the longitudinal direction between the rim member and the shoulder member. The reinforcing member projects outwardly from the neck member.

15 Claims, 10 Drawing Sheets

(51) Int. Cl.
  B65D 1/22 (2006.01)
  B65D 1/46 (2006.01)
  B29C 49/20 (2006.01)
  B29D 22/00 (2006.01)
  B65D 17/00 (2006.01)
  B65D 77/20 (2006.01)
  B29C 49/00 (2006.01)
  B29K 101/00 (2006.01)
  B29L 31/00 (2006.01)

(52) U.S. Cl.
  CPC . B65D 1/44 (2013.01); B65D 1/46 (2013.01); B29C 49/00 (2013.01); B29C 2049/2017 (2013.01); B29K 2101/00 (2013.01); B29L 2031/712 (2013.01); B65D 17/12 (2013.01); B65D 77/2024 (2013.01); B65D 2543/00425 (2013.01)

(56) References Cited

U.S. PATENT DOCUMENTS

| | | |
|---|---|---|
| 5,364,675 A | 11/1994 | Guarriello et al. |
| 2005/0133508 A1 | 6/2005 | Landis et al. |
| 2010/0308066 A1* | 12/2010 | Perry ................ B65D 25/2897 220/810 |
| 2011/0226788 A1* | 9/2011 | Yourist ................ B65D 1/165 220/669 |

* cited by examiner

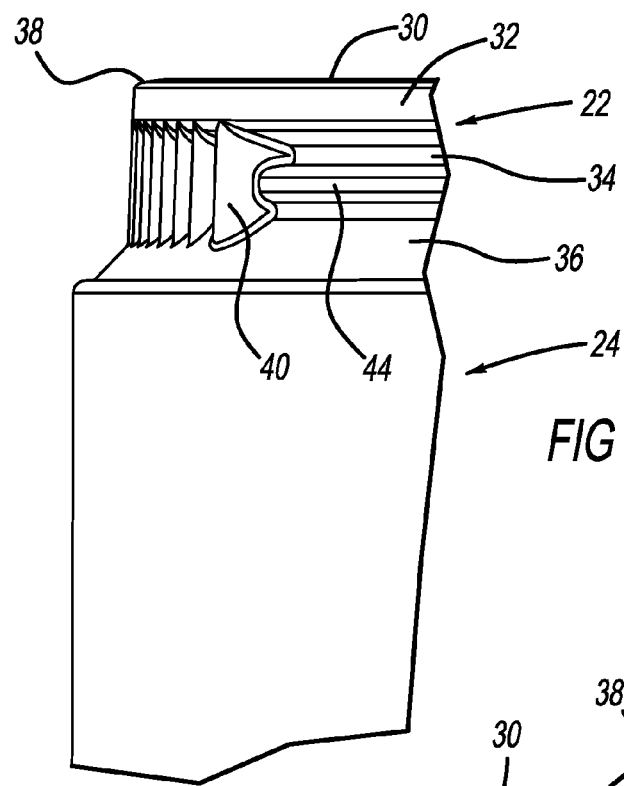
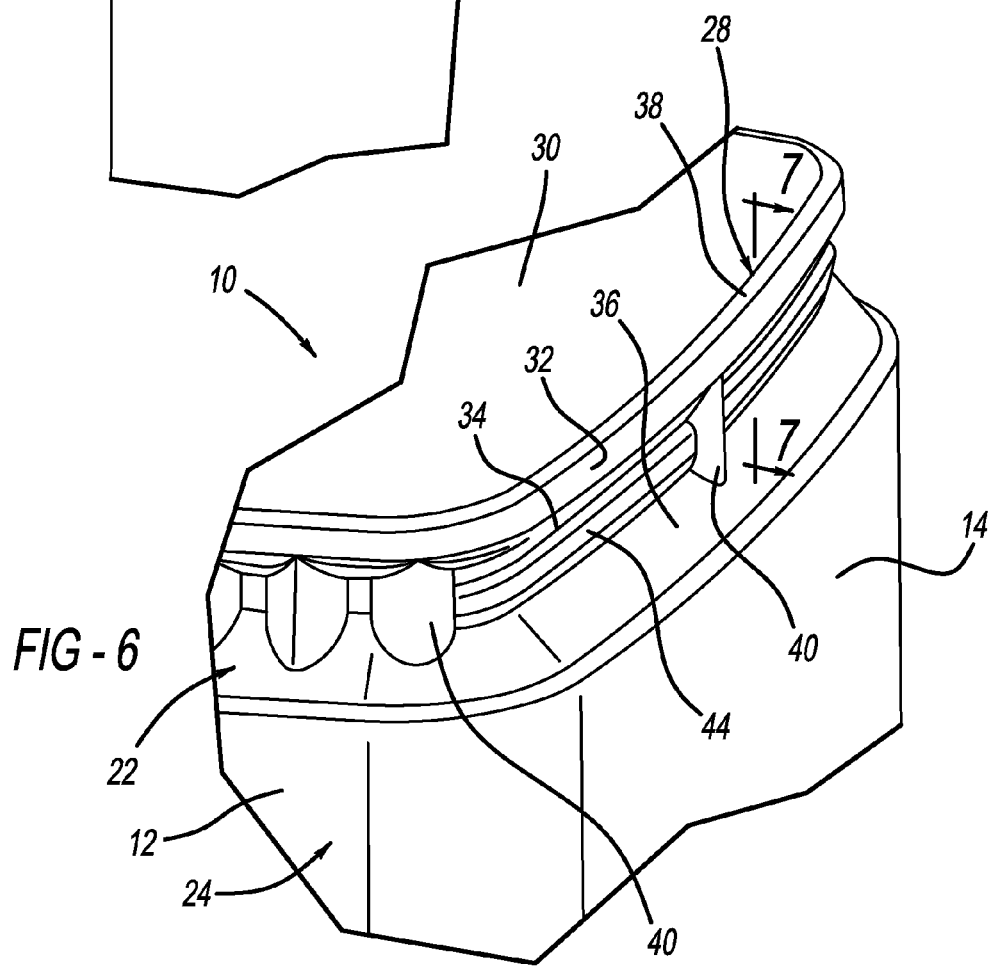

CONTAINER WITH REINFORCED UPPER PORTION FOR RECEIVING WELDED CLOSURE

CROSS-REFERENCE TO RELATED APPLICATIONS

This application is a PCT International Application of U.S. Provisional Patent Application No. 61/602,211 filed on Feb. 23, 2012, the entire disclosure of which is incorporated herein by reference.

FIELD

The present disclosure relates to a container and, more particularly, relates to a container with a reinforced upper portion for receiving a welded closure.

BACKGROUND

This section provides background information related to the present disclosure, which is not necessarily prior art.

Containers can be formed from polymeric materials via various blow molding processes. Once formed, the containers can be filled with a commodity and sealed shut.

In some cases, a container that is within predetermined manufacturing tolerances can deform due to undesirable internal stresses within the material of the container. Furthermore, some containers that are within tolerance when initially formed can deform outside of tolerance(s) once the material of the container cools. Also, some containers may not be sufficiently robust enough to withstand automated trimming, filling, sealing, or other processes without deforming outside of the tolerances. If there is extreme deformation, it can be very difficult to seal the container shut, the container may not look aesthetically pleasing, etc.

SUMMARY

This section provides a general summary of the disclosure, and is not a comprehensive disclosure of its full scope or all of its features.

A plastic container having a longitudinal axis is disclosed. The container includes an upper portion that defines an opening into the container and a sidewall portion that extends from the upper portion in a longitudinal direction parallel to the longitudinal axis. The container also includes a base portion that extends from the sidewall portion and that closes off the container. The upper portion further includes a rim member, a neck member that extends in the longitudinal direction away from the rim member, and a shoulder member that extends from the neck to the sidewall portion. The shoulder member extends at an acute angle relative to a transverse plane that is substantially perpendicular to the longitudinal axis. The upper portion also includes at least one reinforcing member that extends in the longitudinal direction between the rim member and the shoulder member. The reinforcing member projects outwardly from the neck member.

The present teachings also provide for a plastic container having a longitudinal axis that includes an upper portion, a sidewall portion, and a base portion. The upper portion defines an opening into the container. The sidewall portion extends from the upper portion in a longitudinal direction parallel to the longitudinal axis. The base portion extends from the sidewall portion and closes off the container. The upper portion includes a rim member, a neck member, and a shoulder member that extends from the neck to the sidewall portion. At least one reinforcing member extends between the rim member and the shoulder member.

The present teachings further provide a method of forming a plastic container with a longitudinal axis. The method includes providing a mold, and blow molding the container. The container is blow molded to include an upper portion, a sidewall portion, and a base portion. The upper portion defines an opening into the container. The sidewall portion extends from the upper portion in a longitudinal direction parallel to the longitudinal axis. The base portion extends from the sidewall portion and closes off the container. The upper portion includes a rim member, a neck member that extends in the longitudinal direction away from the rim member, and a shoulder member that extends from the neck to the sidewall portion. The shoulder member extends at an acute angle relative to a transverse plane that is substantially perpendicular to the longitudinal axis. The upper portion also includes at least one reinforcing member that extends in the longitudinal direction between the rim member and the shoulder member. At least one reinforcing member projects outwardly from the neck member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a side view of the container of FIG. 1;

FIG. 6 is a perspective view of a second side of the container of FIG. 1;

Corresponding reference numerals indicate corresponding parts throughout the several views of the drawings.

DETAILED DESCRIPTION

Example embodiments will now be described more fully with reference to the accompanying drawings.

Figure 1:
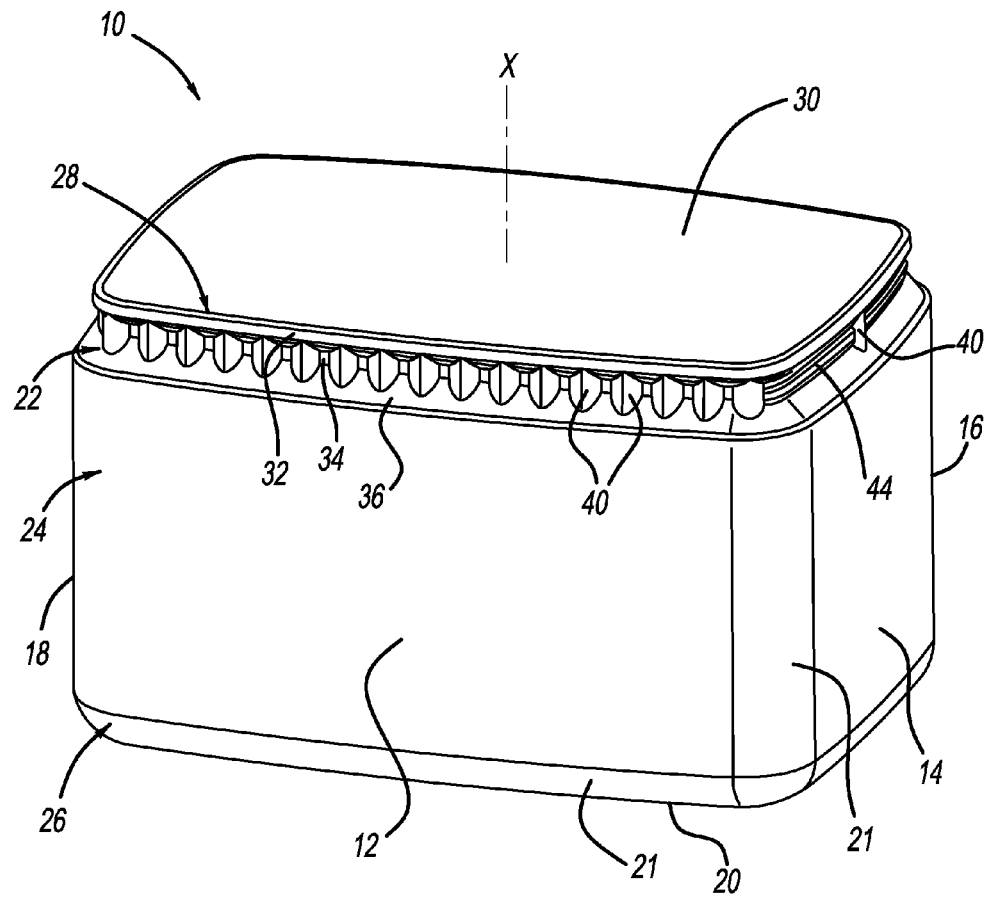
FIG. 1 is a perspective view of an exemplary container according to the teachings of the present disclosure.
Figure 2:
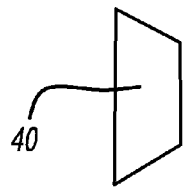
FIG. 2 is a section view of a reinforcing member of the container taken along line 2-2 of FIG. 4.
Figure 4:
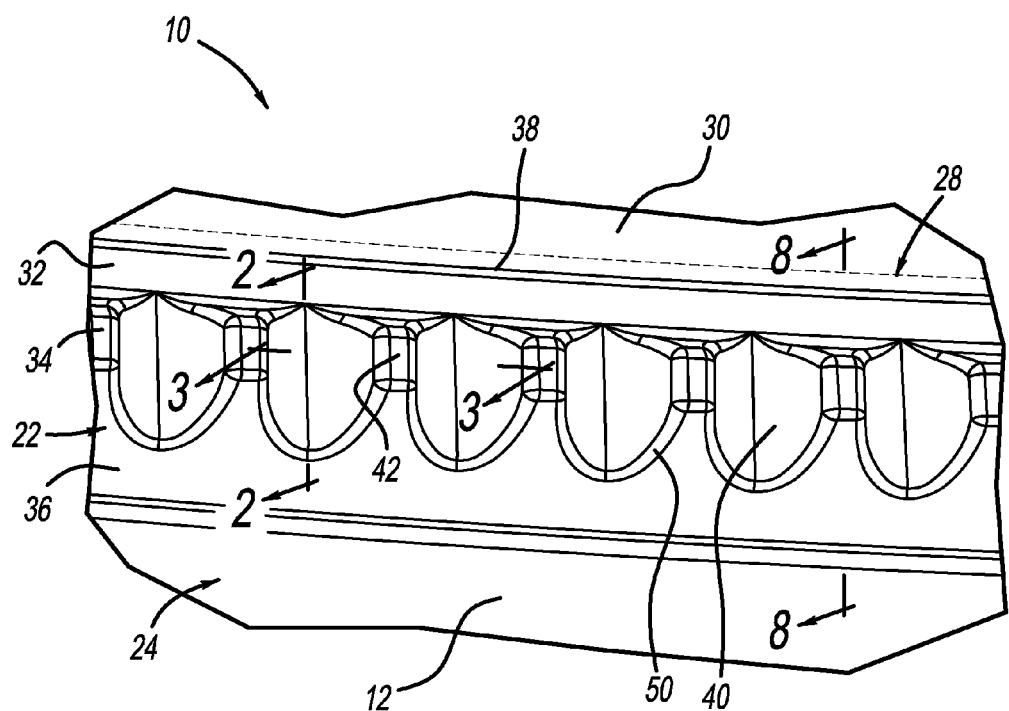
FIG. 4 is a detailed view of the reinforcing members of the container of FIG. 1.

Referring initially to FIGS. 1, 4, and 6, a container 10 is illustrated according to various teachings of the present disclosure. The container 10 can have a hollow, rectangular, box shape so as to define a first side 12, a second side 14, a third side 16, a fourth side 18, and a bottom side 20. The first and third sides 12, 16 are opposite each other and parallel to each other, and the second and fourth sides 14, 18 are opposite each other and parallel to each other. The first and third sides 12, 16 are substantially perpendicular to the second and fourth sides 14, 18. The bottom side 20 can extend between each side 12, 14, 16, 18. Corners 21 can be defined between adjacent sides 12, 14, 16, 18, 20. In some embodiments, the corners 21 can be convexly rounded at any suitable radius (e.g., approximately 0.32 inches). However, the container 10 can have any suitable shape without departing from the scope of the present disclosure.

The container 10 can be made from plastic (e.g., high density polyethylene (HDPE), low density polyethylene (LDPE), polypropylene (PP), nylon, PET etc.) or another suitable thermoplastic material. Furthermore, the container 10 can be a single, monolithic body, or the container 10 can be constructed from multiple parts. Also, the container 10 can be blow molded (i.e., extrusion blow molded, stretch blow molded, injection blow molded, etc.). However, the container 10 can be made in any suitable fashion without departing from the scope of the present disclosure.

The container 10 can generally include an upper portion 22, a sidewall portion 24, and a base portion 26. The upper portion 22 defines an opening 28 into the container 10. The sidewall portion 24 extends from the upper portion 22 in a longitudinal direction that is parallel to the longitudinal axis X of the container 10. The base portion 26 is opposite the opening 28 and extends transversely from the sidewall portion 24 to define the bottom side 20 and to close off the container 10. The upper portion 22 and the sidewall portion 24 define the first, second, third, and fourth sides 12, 14, 16, 18, and the base portion 26 defines the bottom side 20.

The container 10 can also include a closure 30 that is removably attached to the upper portion 22 so as to cover the opening 28. The closure 30 can substantially seal the opening 28 to substantially prevent leakage to or from the container 10. In some embodiments, the closure 30 is a substantially flat sheet of material (e.g., a foil sheet, a plastic sheet, etc.). The closure 30 can be removably attached to the upper portion 22 via welding (e.g., heat sealing, induction, ultrasonic, spin welding, etc.). However, the closure 30 can be attached in other ways, such as adhesives, threading, etc.

Figure 8:
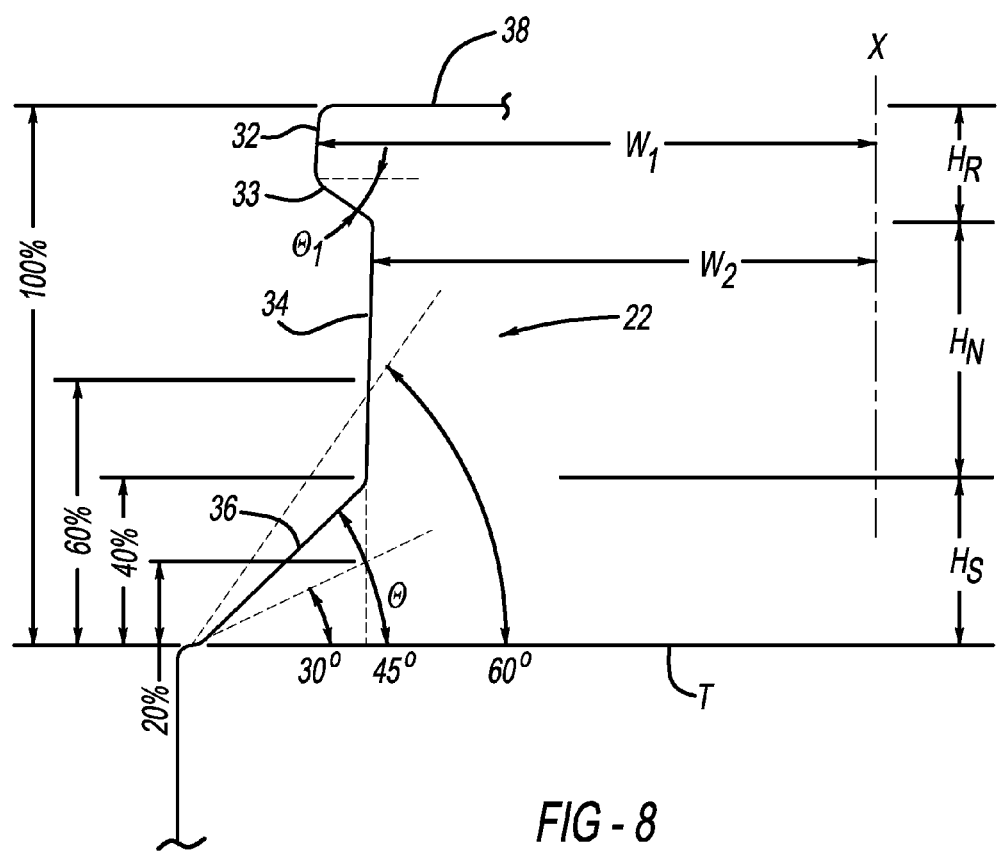
FIG. 8 is a section view of an upper portion of the container taken along the line 8-8 of FIG. 4.

As shown in FIGS. 4, 5, and 6, the upper portion 22 can include a rim member 32, a neck member 34, and a shoulder member 36. The rim member 32 can define the uppermost portion of the container 10 and can include a mounting surface 38 that is substantially perpendicular to the axis X. The closure 30 can attach (e.g., via welding) to the mounting surface 38. A transition wall 33 can taper inward from the rim member 32 at an angle $\theta_1$, as illustrated in FIG. 8 for example. The angle $\theta_1$ can have any suitable value (e.g., approximately thirty degrees). The neck member 34 can extend longitudinally downward and away from the rim member 32, and the shoulder member 36 can extend from the neck member 34 to the sidewall portion 24. The shoulder member 36 can extend outwardly from the neck member 34 to the sidewall portion 24 at an acute angle $\theta$ relative to a transverse plane T that is substantially perpendicular to the axis X. The acute angle $\theta$ can have any suitable value. For instance, the angle $\theta$ can be at least approximately thirty degrees and at most sixty degrees, and in some embodiments, the acute angle $\theta$ can be approximately forty-five degrees.

As shown in FIG. 8, the rim member 32 can be disposed at a first width W1 from the longitudinal axis X. The neck member 34 can be disposed at a second width W2 from the longitudinal axis X. The first width W1 can be greater than the second width W2. Additionally, as shown in FIG. 8, the rim member 32 can have a rim height $H_R$, the neck member 34 can have a neck height $H_N$, and the shoulder member 36 can have a shoulder height $H_S$, each measured parallel to the axis X. The shoulder height $H_S$ can be between approximately 20% and 60% of the sum of the shoulder height $H_S$ and neck height $H_N$. In some embodiments, the shoulder height $H_S$ can be approximately 40% of the sum of the shoulder height $H_S$ and neck height $H_N$.

Figure 3:
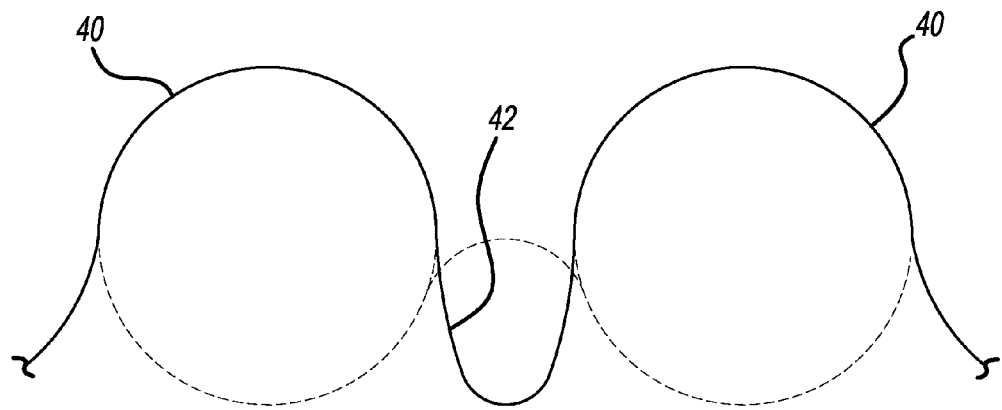
FIG. 3 is a section view of the reinforcing members taken along the line 3-3 of FIG. 4.

Also, the container 10 can include one or more reinforcing members 40. In some embodiments, there is a plurality of reinforcing members 40 that are columnar or beam-like. The reinforcing members 40 can extend substantially parallel to the longitudinal axis X and can connect at each longitudinal end to the rim member 32 and the shoulder member 36, respectively. Also, the reinforcing member 40 can project transversely outward from surrounding portions of the neck member 34. In some embodiments, the reinforcing member 40 can be rounded in the transverse direction (i.e., rounded in a cross section taken perpendicular to the axis X). In the embodiments of FIG. 3, the reinforcing members 40 can be semi-circular in a transverse cross section; however, the reinforcing members 40 can be triangular, squared, rectangular, ovate, or elliptical in transverse cross section. The reinforcing members 40 can have a diameter of approximately 0.25 inches in the embodiments shown in FIG. 3.

In the embodiments illustrated, the first and third sides 12, 16 can each include a plurality of (e.g., seventeen) reinforcing members 40 that are spaced approximately evenly from each other. As shown in FIG. 3, the reinforcing members 40 can be spaced approximately 0.3494 inches apart (center-to-center distance measured transversely) to define a concave pocket 42 between adjacent convex reinforcing members 40. The pocket 42 can be rounded and can have a depth of approximately 0.125 inches and can have a radius of approximately 0.06 inches.

Also, the second and fourth sides 14, 18 of the container 10 can each include only one respective reinforcing member 40. The reinforcing member 40 can be substantially centered on the respective side 14, 18 as shown in FIGS. 1 and 6.

Furthermore, the container 10 can include one or more concave transitions 50 (FIG. 4) between the reinforcing member 40 and at least one of the shoulder member 36, the neck member 34, and the rim member 32. In the embodiments illustrated, the concave transitions 50 are included between the reinforcing member 40 and each of the shoulder member 36, the neck member 34, and the rim member 32. The transitions 50 can be rounded at any suitable radius (e.g., approximately 0.03 inches, etc.).

In some embodiments, the first and third sides 12, 16 can have a straight corner-to-corner length (i.e., end-to-end length) measured transversely on the neck member 34 between opposing corners 21. The first and third sides 12, 16 can also have a non-linear peripheral length measured from one corner 21, over the outer surface of the reinforcing members 40, to the opposite corner 21. These lengths can be measured at the same longitudinal height of the container 10. The peripheral length can be approximately 20% to 30% greater than the corner-to-corner length. In some embodiments, the peripheral length can be 25% greater than the corner-to-corner length. Also, the reinforcing members 40 can increase the surface area of the neck member 34 by at least 2% in some embodiments.

Figure 7:
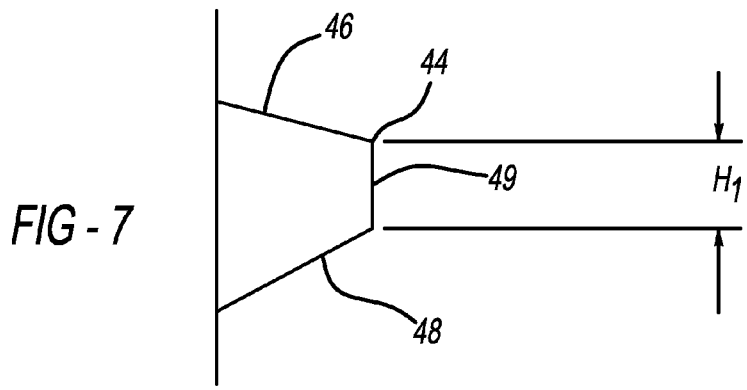
FIG. 7 is a section view of a rib of the container taken along line 7-7 of FIG. 6.

Furthermore, the container 10 can include a rib 44 that projects outwardly from the neck member 34 on the second and fourth sides 14, 18. As shown in the cross section of FIG. 7, the rib 44 can include a top side 46, a bottom side 48, and an outer side 49. The top and bottom sides 46, 48 can taper toward each other, and the outer side 49 can extend substantially parallel to the axis X between the top and bottom sides 46, 48. The rib 44 can longitudinally extend in the transverse direction along the second and fourth sides 14, 18, and the reinforcing members 40 on the second and fourth sides 14, 18 can bisect the ribs 44 in the transverse direction. In the embodiments shown in FIG. 7, the outer side 49 can have a height H1 of approximately 0.08 inches. The outer side 49 can also be set back inwardly from the sidewall portion 24 by a transverse distance of approximately 0.05 inches. The rib 44 can be spaced longitudinally evenly between the rim member 32 and the shoulder member 36.

Accordingly, the upper portion 22 of the container 10 is unlikely to deform after being molded and trimmed due to the reinforcing members 40, the rib 44, and the tapered profile of the shoulder member 36. More specifically, the upper portion 22 is unlikely to deform and collapse inward or outward relative to the axis X. Deformation of the upper portion 22 is less likely because the upper portion 22 can more evenly distribute loads due to the shapes, geometries, positions, etc. of the upper portion 22. Also, the curved and rounded surfaces of the upper portion 22 can reduce in-mold stresses in the material. Additionally, material can flow as desired during formation (e.g., blow molding) of the container 10. Because the upper portion 22 is unlikely to deform, the closure 30 can readily attach to the rim member 32 as desired.

Furthermore, the container 10 can withstand significant top loading due to these features. For instance, the container 10 can be subject to significant compressive forces while the closure 30 is welded to the rim member 32. Because the upper portion 22 is unlikely to collapse inward or outward even under this loading, the closure 30 can be readily attached.

Figure 9A:
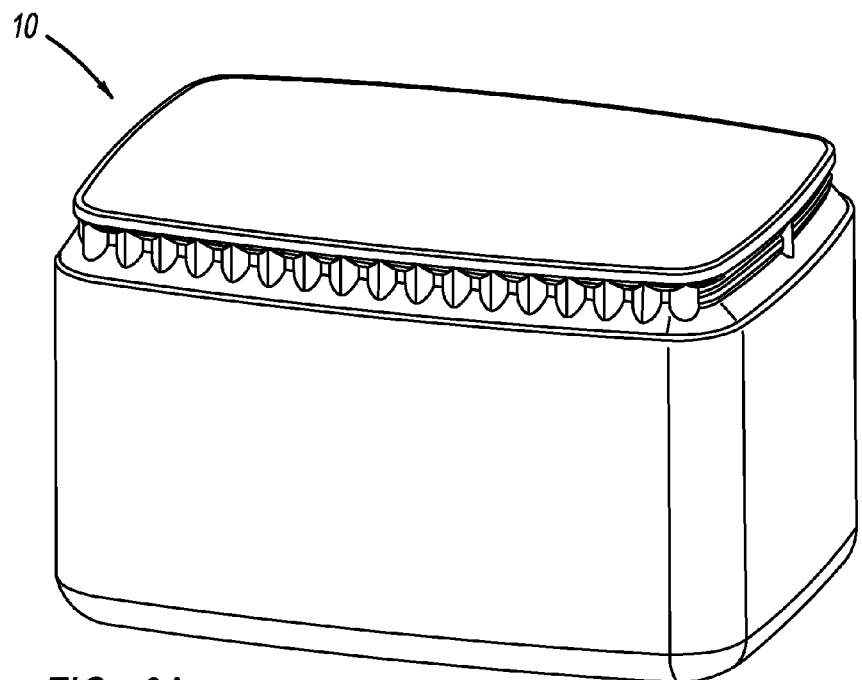
FIG. 9A is another perspective view of the container of FIG. 1.
Figure 9B:
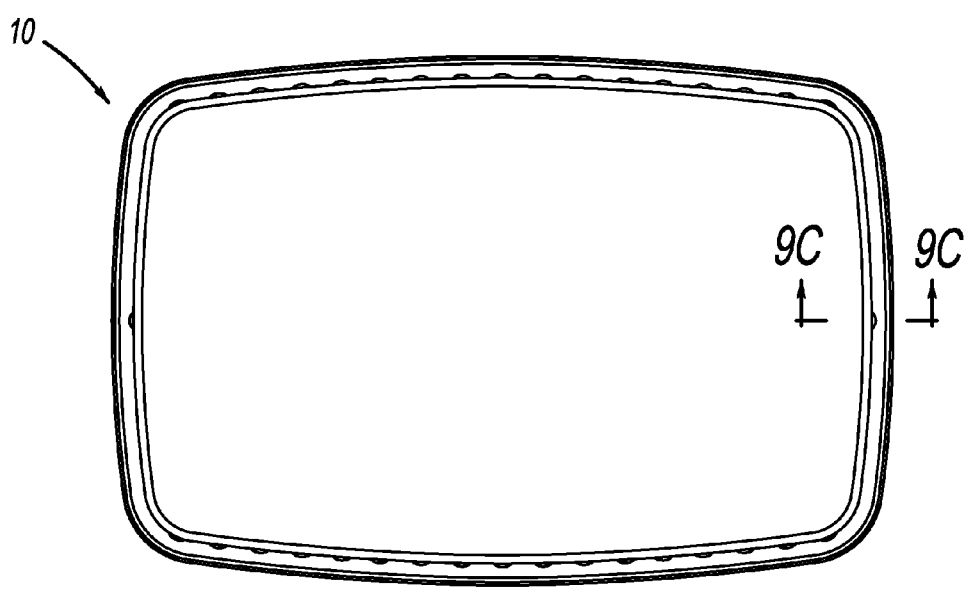
FIG. 9B is a top view of the container of FIG. 9A.
Figure 9C:
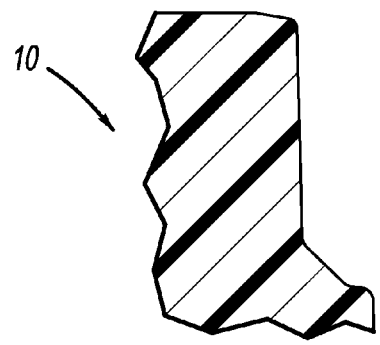
FIG. 9C is a cross-sectional view taken along line 9C-9C of FIG. 9B.
Figure 9D:
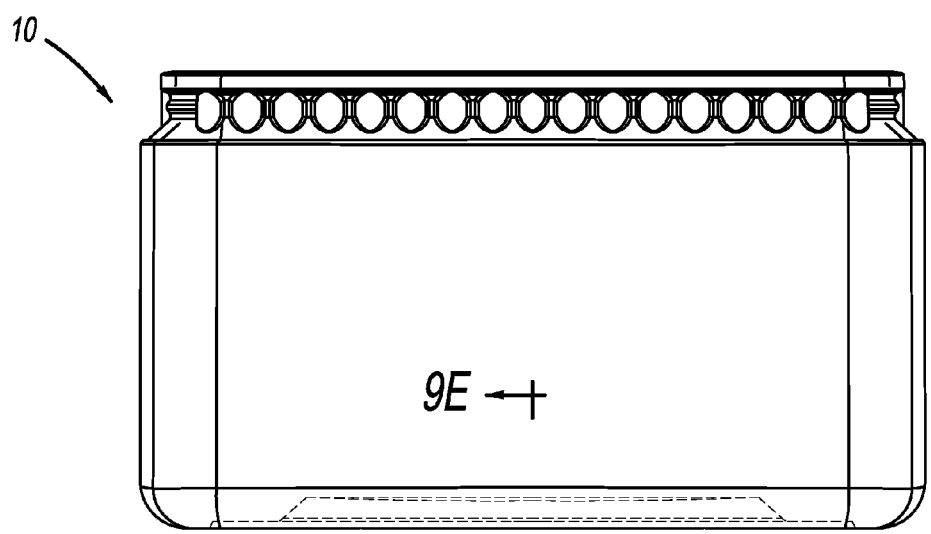
FIG. 9D is a side view of the container of FIG. 9A.
Figure 9E:
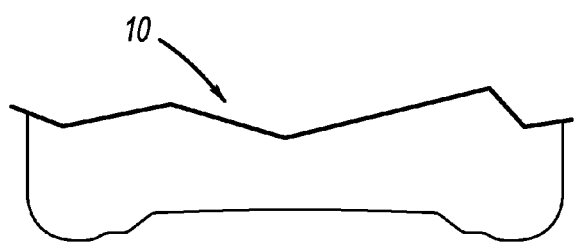
FIG. 9E is a cross-sectional view taken along line 9E-9E of FIG. 9D.
Figure 9F:
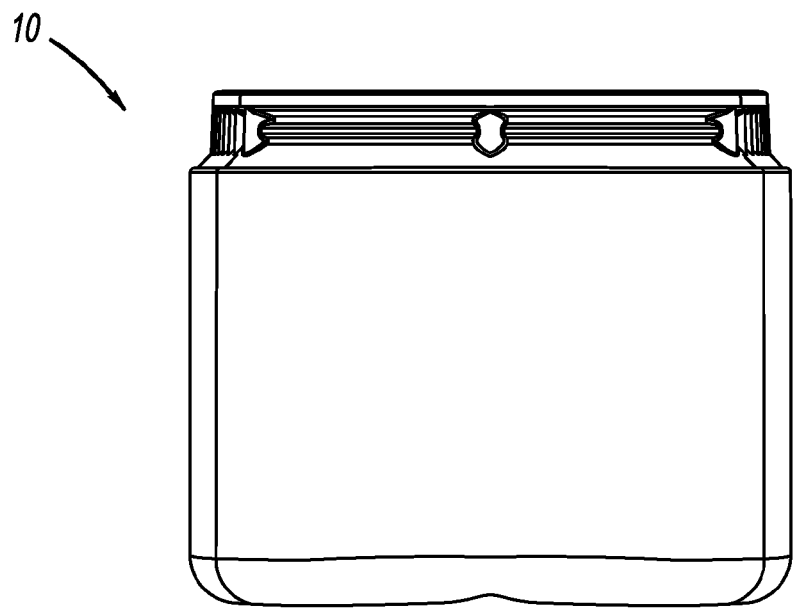
FIG. 9F is a side view of the container of FIG. 9A.
Figure 9G:
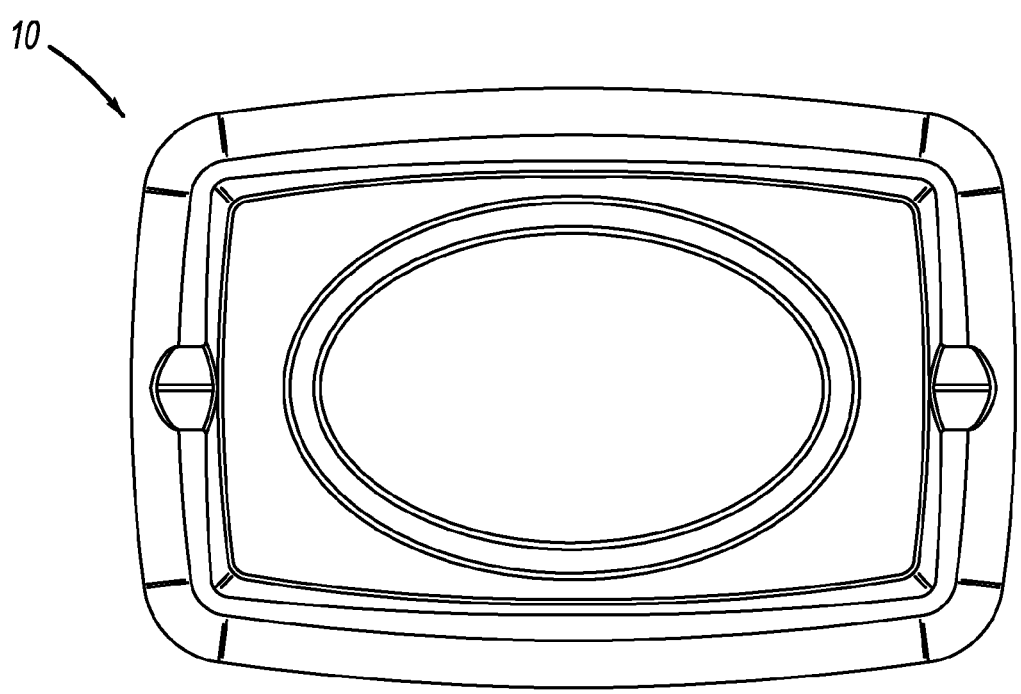
FIG. 9G is a bottom view of the container of FIG. 9A.

FIGS. 9A-9G illustrate additional details of the container 10. FIG. 9A is an additional perspective view of the container 10. FIG. 9B is a top view of the container 10. FIG. 9C is a cross-sectional view of the container 10 taken along line 9C-9C of FIG. 9B. FIG. 9D is a side view of the container 10. FIG. 9E is a cross-sectional view of the container 10 taken along line 9E-9E of FIG. 9D. FIG. 9F is a side view of the container 10. FIG. 9G is a bottom view of the container 10.

Figure 10:
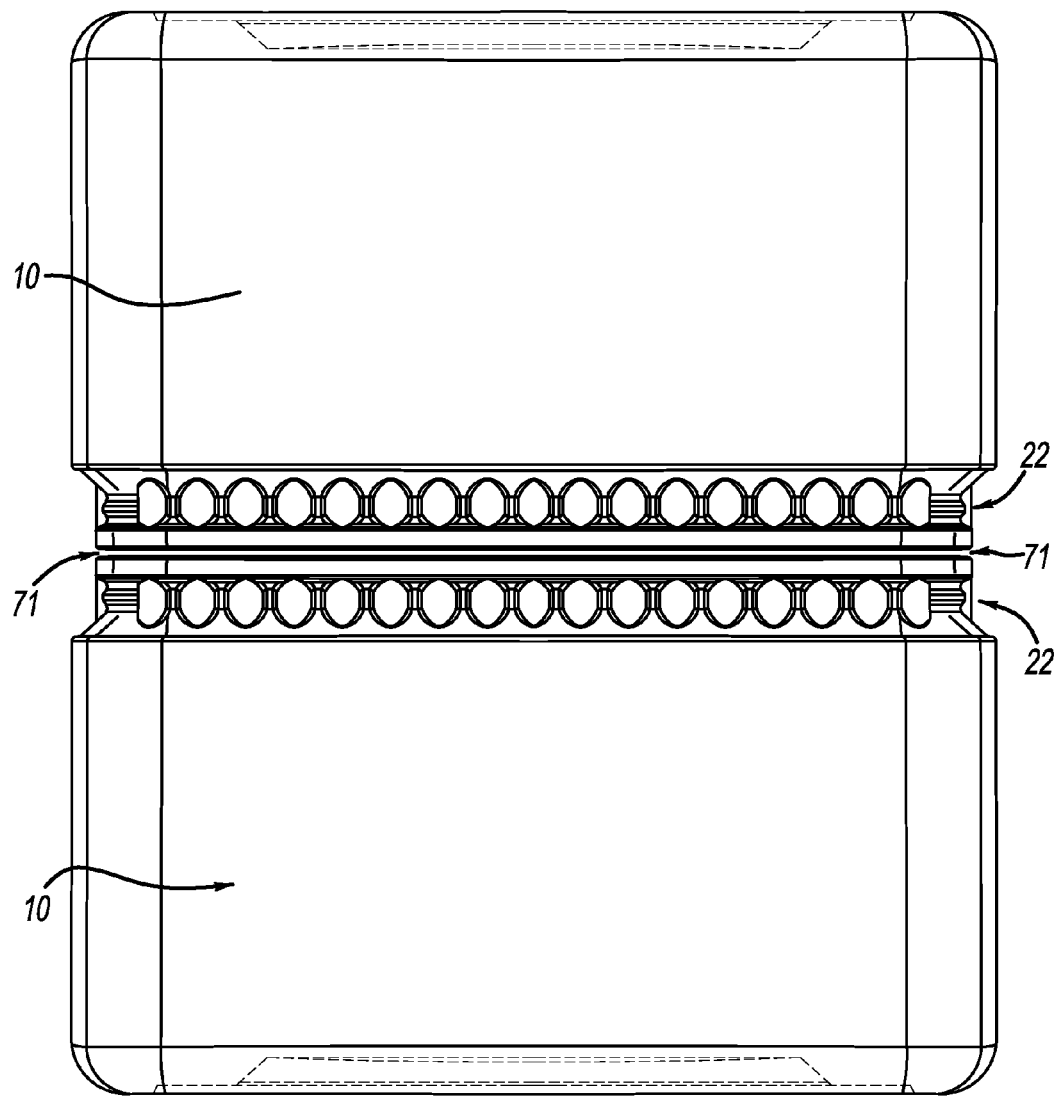
FIG. 10 is a side view of a plurality of containers of the present disclosure that are joined directly together prior to trimming.

Referring now to FIG. 10, a method of manufacturing the container 10 is illustrated according to exemplary embodiments. As shown, two containers 10 can be simultaneously molded (e.g., via extrusion blow molding, injection blow molding, stretch blow molding, etc.). The two containers 10 can be formed so as to be mirror images of each other, and the two containers 10 can be joined along a trim line 71. In the embodiments shown, the trim line is defined within a plane disposed between the respective upper portions 22 of the containers 10.

Once the containers 10 have been formed and sufficiently cooled, the containers 10 can be trimmed (cut) apart. The trimming operation can be a manual operation or an automated operation. Also, the trimming tool can move relative to the containers 10 during trimming, the containers 10 can move relative to the trimming tool, or the trimming tool and the containers 10 can both move relative to each other during trimming operations.

Because of the various features of the container 10 discussed above, the containers 10 are unlikely to deform after trimming. Thus, the containers 10 can be subsequently filled and sealed or otherwise processed as intended.

Figure 11:
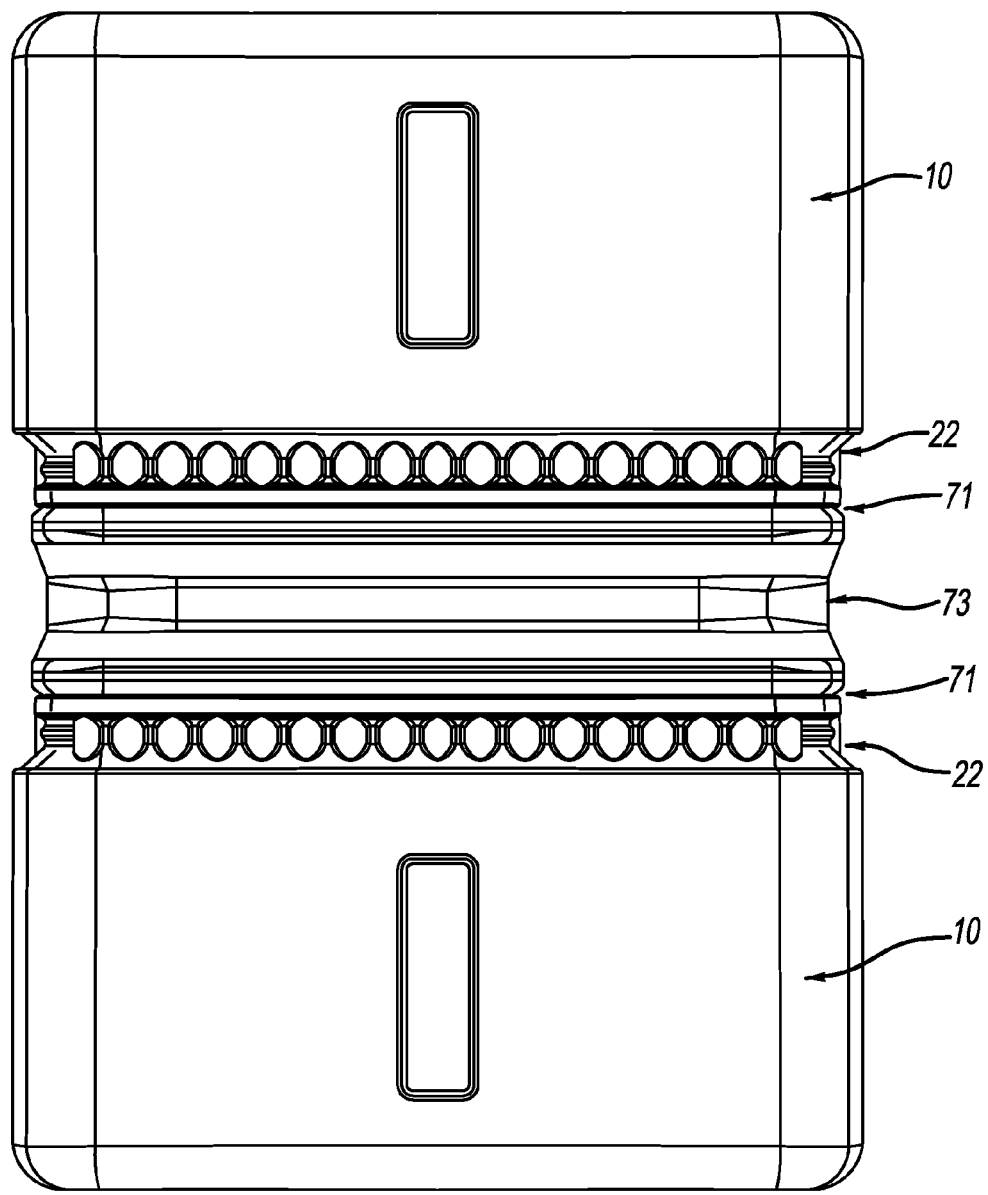
FIG. 11 is a side view of a plurality of containers of the present disclosure that are joined together via a trim piece.

Referring now to FIG. 11, additional embodiments of manufacturing the containers 10 are illustrated. The embodiments of FIG. 11 are substantially similar to the embodiments of FIG. 10, except that the containers 10 are joined together via a trim piece 73. The trim piece 73 can be of any suitable shape, such as a short, rectangular piece of material that joins to the upper portions 22 of the containers 10. Once formed, the containers 10 can be trimmed away from the trim piece 73 along the respective trim lines 71, similar to the embodiments discussed above with respect to FIG. 10. The trim piece 73 can then be discarded or recycled, and the container 10 can be filled and sealed with a commodity.

Figure 12:
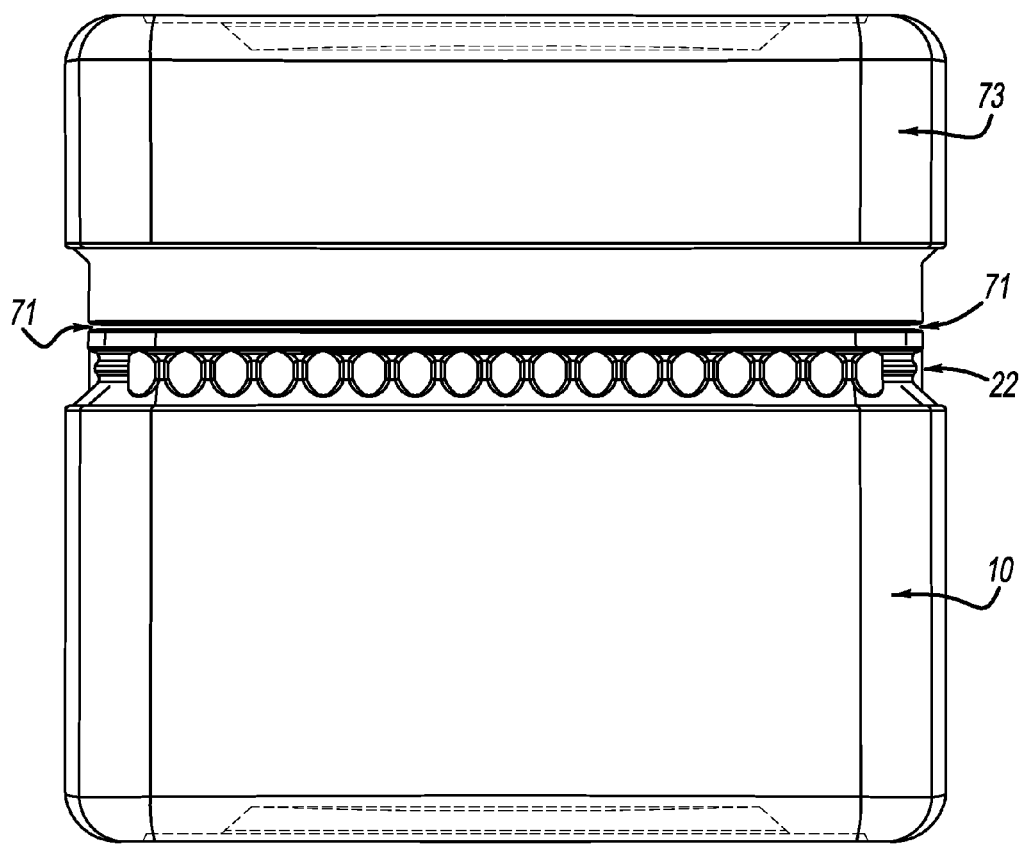
FIG. 12 is a side view of a container of the present disclosure with a trim piece attached thereto.

Referring now to FIG. 12, additional embodiments of manufacturing the container 10 are illustrated. The embodiments of FIG. 12 are substantially similar to the embodiments of FIGS. 10 and 11, except that the container is initially formed with the trim piece 73 connected to the upper portion 22. The trim piece 73 can be a rectangular dome that covers over the upper portion 22 or can be of any other shape. Once formed, the trim piece 73 can be trimmed away from the container 10, and then the container 10 can be filled and sealed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A plastic container having a longitudinal axis: that extends through a center of an opening of the container comprising:

an upper portion that defines the opening into the container;

a sidewall portion that extends from the upper portion in a longitudinal direction parallel to the longitudinal axis; and a base portion that extends from the sidewall portion and that closes off the container, the base portion extending perpendicularly to the longitudinal axis, the upper portion including:

a rim member;

a neck member that extends in the longitudinal direction away from the rim member;

a shoulder member that extends from the neck to the sidewall portion, the shoulder member extending at an acute angle relative to a transverse plane that is substantially perpendicular to the longitudinal axis;

a first side and a second side that extends parallel to the first side;

a third side and a fourth side that extends parallel to the third side, the third and fourth sides extend perpendicular to the first and second sides and are arranged at opposite ends of the first and second sides;

a plurality of first reinforcing members evenly spaced apart along the first side, each one of the first reinforcing members protecting outwardly from the neck member and extending in the longitudinal direction between the rim member and the shoulder member;

a plurality of second reinforcing members evenly spaced apart along the second side, each one of the second reinforcing members protecting outwardly from the neck member and extending in the longitudinal direction between the rim member and the shoulder member;

a first rib protecting outwardly from the neck member at the third side and extending longitudinally in a transverse direction that is perpendicular to the longitudinal axis, a single side reinforcement member projects outward from the neck member at the third side and is centered along a length of the first rib; and a second rib protecting outwardly from the neck member at the fourth side and extending longitudinally in a transverse direction that is perpendicular to the longitudinal axis, a single side reinforcement member projects outward from the neck member at the fourth side and is centered along a length of the second rib;

wherein the container is rectangular.

2. The plastic container of claim 1, wherein each one of the first and second reinforcing members are rounded in a cross section taken perpendicular to the longitudinal axis.

3. The plastic container of claim 1, further comprising a concave transition between each one of the first and second reinforcing members and at least one of the shoulder member, the neck member, and the rim member.

4. The plastic container of claim 1, wherein the acute angle is at least approximately thirty degrees and at most approximately sixty degrees.

5. The plastic container of claim 4, wherein the acute angle is approximately forty-five degrees.

6. The plastic container of claim 1, wherein the shoulder member has a shoulder height measured parallel to the longitudinal axis and the neck member has a neck height measured parallel to the longitudinal axis, wherein the neck height and the shoulder height have a combined height, wherein the shoulder height is between approximately 20% and 60% of the combined height.

7. The plastic container of claim 6, wherein the shoulder height is approximately 40% of the combined height.

8. The plastic container of claim 1, wherein the upper portion includes a side with a first end and a second end, wherein the side defines a straight end-to-end length measured from the first end to the second end, and wherein the side defines a non-linear peripheral length measured from the first end, over the at least one reinforcing member, to the second end, the peripheral length and the end-to-end length are measured at a same longitudinal height of the container, the peripheral length being between approximately 20% to 30% greater than the end-to-end length.

9. The plastic container of claim 8, wherein the peripheral length is approximately 25% greater than the end-to-end length.

10. The plastic container of claim 1, wherein with the at least one reinforcing member a surface area of the neck member is at least 2% greater than without the at least one reinforcing member.

11. The plastic container of claim 1, further comprising a closure that is removably attached to the rim member to cover the opening.

12. The plastic container of claim 11, wherein the closure is welded to the rim member.

13. A method of forming a plastic container with a longitudinal axis that extends through a center of an opening of the container comprising:

providing a mold; and blow molding the container to include:

an upper portion that defines the opening into the container;

a sidewall portion that extends from the upper portion in a longitudinal direction parallel to the longitudinal axis; and a base portion that extends from the sidewall portion and that closes off the container, the base portion extending perpendicularly to the longitudinal axis, the upper portion including a rim member, a neck member that extends in the longitudinal direction away from the rim member, and a shoulder member that extends from the neck to the sidewall portion, the shoulder member extending at an acute angle relative to a transverse plane that is substantially perpendicular to the longitudinal axis;

a first side and a second side that extends parallel to the first side;

a third side and a fourth side that extends parallel to the third side, the third and fourth sides extend perpendicular to the first and second sides and are arranged at opposite ends of the first and second sides;

a plurality of first reinforcing members evenly spaced apart along the first side, each one of the first reinforcing members protecting outwardly from the neck member and extending in the longitudinal direction between the rim member and the shoulder member;

a plurality of second reinforcing members evenly spaced apart along the second side, each one of the second reinforcing members protecting outwardly from the neck member and extending in the longitudinal direction between the rim member and the shoulder member;

a first rib protecting outwardly from the neck member at the third side and extending longitudinally in a transverse direction that is perpendicular to the longitudinal axis, a single side reinforcement member protects outward from the neck member at the third side and is centered along a length of the first rib; and a second rib protecting outwardly from the neck member at the fourth side and extending longitudinally in a transverse direction that is perpendicular to the longitudinal axis, a single side reinforcement member protects outward from the neck member at the fourth side and is centered along a length of the second rib;

wherein the container is rectangular.

14. The method of claim 13, further comprising attaching a closure over the opening.

15. The method of claim 14, wherein attaching the closure includes welding the closure to the rim member.

* * * * *